United States Patent
Lechner et al.

(10) Patent No.: US 7,779,995 B2
(45) Date of Patent: Aug. 24, 2010

(54) CONNECTOR ARRANGEMENT, CONNECTOR ELEMENT AND METHOD OF PRODUCING THE SAME

(75) Inventors: Franz Lechner, Grafing (DE); Hermann Pauker, Soyen (DE)

(73) Assignee: Sefar AG, Rüschlikon (CH)

( * ) Notice: Subject to any disclaimer, the term of this patent is extended or adjusted under 35 U.S.C. 154(b) by 300 days.

(21) Appl. No.: 11/992,384

(22) PCT Filed: Sep. 22, 2005

(86) PCT No.: PCT/EP2005/010278

§ 371 (c)(1),
(2), (4) Date: Mar. 21, 2008

(87) PCT Pub. No.: WO2007/033698

PCT Pub. Date: Mar. 29, 2007

(65) Prior Publication Data

US 2009/0266686 A1    Oct. 29, 2009

(51) Int. Cl.
*B65G 15/34* (2006.01)
(52) U.S. Cl. .................................. 198/844.2; 24/31 B
(58) Field of Classification Search ............. 198/844.2; 474/218, 255, 256; 24/33 R, 33 K, 31 B
See application file for complete search history.

(56) References Cited

U.S. PATENT DOCUMENTS

| | | | | |
|---|---|---|---|---|
| 2,799,177 A | * | 7/1957 | Douglas | 198/847 |
| 3,744,095 A | * | 7/1973 | Tomlinson | 24/38 |
| 3,748,699 A | * | 7/1973 | Cunningham | 24/38 |
| 4,170,281 A | * | 10/1979 | Lapeyre | 198/844.2 |
| 4,705,495 A | * | 11/1987 | Madion | 474/255 |
| 5,246,100 A | * | 9/1993 | Stone et al. | 198/844.2 |
| 5,542,527 A | | 8/1996 | Jakob et al. | |
| 5,839,571 A | * | 11/1998 | Jakob | 198/844.2 |
| 6,571,939 B2 | * | 6/2003 | Tarnawskyj et al. | 198/844.2 |
| 2002/0050445 A1 | * | 5/2002 | Shaffer | 198/844.2 |

FOREIGN PATENT DOCUMENTS

FR    1 065 983    6/1954

* cited by examiner

*Primary Examiner*—Mark A Deuble
(74) *Attorney, Agent, or Firm*—Jacobson Holman PLLC

(57) ABSTRACT

A connector arrangement for connecting web ends (5), in particular an endless filter web, comprises two elongate elements which each have at least one elongate leg (1, 2) for fastening on one of the web ends (5), and a longitudinal flank (9) directed away from the web end (5). In a first longitudinal-section plane the longitudinal flank (9) has a first periodic contour, which engages in a corresponding contour of the other element respectively. In a second and third cross-section plane extending parallel to the first longitudinal-section plane, the elements each have second and third periodic contours (10, 11), which engage in a form-fitting manner in respectively corresponding contours (10, 11) of the other element respectively. The first to third contours form a groove (13, 13') and a tongue (12) in at least one cross-section plane.

19 Claims, 4 Drawing Sheets

CONNECTOR ARRANGEMENT, CONNECTOR ELEMENT AND METHOD OF PRODUCING THE SAME

CROSS-REFERENCE TO RELATED APPLICATIONS

This is a national stage of PCT/EP05/010278 filed Sep. 22, 2005 and published in German.

BACKGROUND OF THE INVENTION

1. Field of the Invention

The present invention relates to a connector arrangement for connecting the ends of one or two webs consisting of a flexible material as well as to a single connector element for such an arrangement. Connector arrangements of such type are employed for example to join two ends of a conveyer belt, a filter belt or the like to an endless belt. Furthermore, the invention relates to a method for producing a connector element for such an arrangement.

2. Description of Related Art Including Information Disclosed Under 37 CFR §§1.97 and 37 CFR 1.98

From DE 198 20 204 A1 a connector arrangement is known with two elements formed of sheet metal that are each clamped to the end of a web and form loops reaching beyond the ends of the web, wherein, for the purpose of connecting the web ends, the loops of one element are each introduced into interspaces between the loops of the other element and a wire is inserted through the loops of both elements in order to fix the connector elements to each other.

This connector arrangement is not optimally suited for application in a filter plant because when it is used for connecting the ends of a filter web any liquid charged with material to be filtered out can pass through in the part of the mutually engaging loops in an insufficiently filtered state.

Likewise, the way of fastening the connector elements to the web ends by piercing metal clamps through the web material does not prove to be suitable for every kind of web. Tensile forces acting on the web can lead to the formation of holes in the web at the pierced parts, through which liquid can penetrate unfiltered so that the web becomes unserviceable.

DE 87 04 382 U1 tries to solve the problem of insufficient tightness of the connector arrangement by means of a flexible rail which, by being held on the wire inserted through the loops, presses in a resilient manner against the surface of the web on both sides of the connector arrangement. If the contact between the rail and the web is sealed for the liquid to be filtered it cannot reach the mutually engaging connector elements and is therefore unable to pass through at uptight parts between the connector elements or on the transition between a connector element and the filter web fastened on it.

However, the need to additionally fasten the rail during connection of the web ends renders the joining of web ends by means of this connector arrangement laborious, since the inserted wire not only has to keep the connector elements fastened to each other but also fastened to the rail. Moreover, a high web tension is required to ensure that the edges of the rail press hard enough onto the web surface so as to prevent penetration of unfiltered liquid between the web surface and the edges of the rail. The high tension, however, fosters wear of the web.

To prevent damage of the webs by pierced metal clamps, connector arrangements have also been proposed, the elements of which are each sewn to the web ends. However, in this case the problem arises that in the parts where the threads employed for sewing lie exposed on the surface of the connector elements they are subjected to a high degree of wear due to the circulating movement of the web. Therefore, with these connector arrangements there is the risk of the threads being torn during operation and the web end detaching from the connector element sewn to it.

BRIEF SUMMARY OF THE INVENTION

An object of the invention is to provide a connector arrangement for connecting web ends that brings about an easy-to-lock and reliably tight connection between two web ends.

This object is solved by a connector arrangement for connecting web ends, in particular an endless filter web, comprising two elongate elements, which each have at least one elongate leg for fastening on one of the web ends and a longitudinal flank which is directed away from the web end and which has a first contour in a first longitudinal-section plane extending in the longitudinal direction of the elements, which first contour engages in a corresponding contour of the other element respectively, wherein in a second and third longitudinal-section plane extending parallel to the first longitudinal-section plane the elements furthermore have second and third contours, which engage in a form-fitting manner in respectively corresponding contours of the other element respectively, characterized in that the first to third contours form a groove and a tongue in at least one cross-section plane extending perpendicular to the longitudinal direction. Due to the fact that the three contours of the elements each engage with each other in a form-fitting manner and in addition form a groove and a tongue in cross-section, prevention can be made in a reliable manner of slots occurring between the two elements during operation, through which a liquid to be filtered can pass unfiltered.

For easy production of the connector elements all contours should preferably have the same period.

To facilitate production the second and third contours, which lie in the second and third longitudinal-section planes on both sides of the first longitudinal-section plane, are preferably congruent.

In addition, it is suitable for the contours to be rectangular contours.

The elements of the connector arrangement should be congruent so that both elements can be produced with one and the same molding tool.

Another object of the invention is to provide a connector element, which permits a reliable and load-bearing fastening of a web end to the connector element through sewing.

This object is solved by providing a connector element in which the leg of the connector element, onto which the web is to be sewn, is provided with channels on one exterior side. If the threads, with which the web is firmly sewn, run in the channels along this exterior side, they are protected against mechanical stress caused by the web movement, whereby a reliable and permanent fastening of the web to the connector element is attained.

For best suitability the channels extend in the longitudinal direction of the connector element.

By preference, each of the connector elements has two legs of the above-described type which delimit a groove for accommodating the web end.

On such a leg, the simplest possibility of forming through-holes for a thread, with which the web end is sewn to the connector element, is to pierce these holes with a needle. In this way the material of the leg is not removed but, at most, displaced laterally. The piercing can be effected directly during sewing but it is also possible to facilitate sewing by producing the holes as early as during production of the connector element.

During piercing with a needle certain types of plastic material develop a tip that surrounds the hole pierced by the needle on the exit side. Such a tip fosters severely wear of a thread passed through such a hole. The inventor discovered that polyurethane, polyamide and soft PVC do not develop such a tip so that preference is given to these materials for the production of the connector element according to the invention.

There is also the possibility of drilling or punching the through-holes for the thread beforehand instead of piercing them with a needle. In such case the risk of a tip formation does not arise so that other materials beside the ones stated above can also be employed in an advantageous manner for the production of the connector element.

Furthermore, the subject matter of the invention is a method for producing a connector element for a connector arrangement of the above-described kind. Due to the periodic contours of the connector element the extrusion molding method proves to be unsuitable for its production. Although use can be made of conventional injection molding methods, these only permit production of connector elements with clearly defined lengths. However, it is desirable to be able to produce the connector elements as continuous profiles with undefined length. For this purpose the invention proposes a modified injection molding method with the following steps:

Providing an injection mold, which is adapted to mold therein a section of the connector element and which is open at one end of the section;

Sealing the open end;

Injecting material into the mold in order to obtain a section of the connector element;

Cyclically repeating steps b) and c), wherein for sealing the mold in step b) the section obtained each time in the preceding step c) is used.

Due to the periodicity of the contours of the connector element it is possible to demold the section of the connector element obtained in step c) and to subsequently place it into the mold again by displacing it by a number of periods so that the section partly protrudes from the mold and room is made in the mold for a new section to be injection molded on the previously obtained section. For this successive injection molding polyurethane is especially suitable as material.

BRIEF DESCRIPTION OF THE SEVERAL VIEWS OF THE DRAWINGS

Further features and advantages of the invention become apparent from the following description of embodiments with reference to the accompanying drawings, wherein.

DETAILED DESCRIPTION OF THE INVENTION

Figure 1:
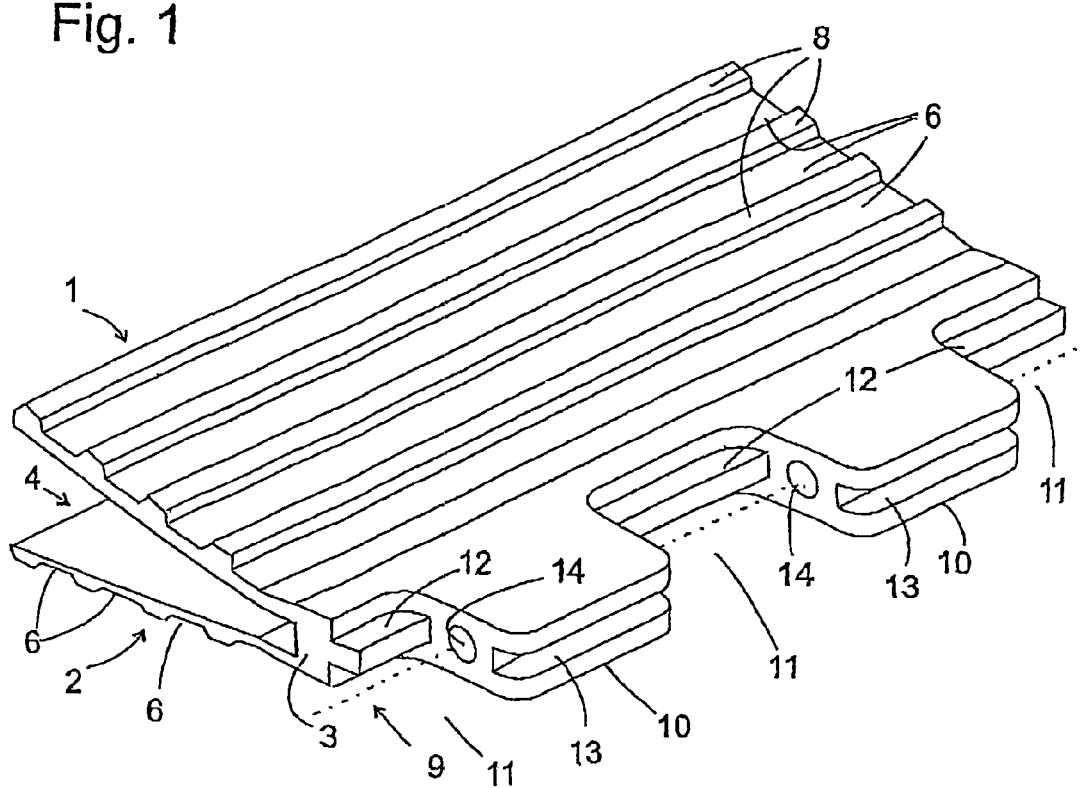
FIG. 1 shows a perspective view of a connector element according to a first embodiment of the invention.

FIG. 1 is a detailed view of a connector element in accordance with the present invention. A main section of the connector element has the shape of a U-profile with legs 1, 2 that are connected by a bridge 3. The groove 4 delimited by the legs 1, 2 is provided to fasten therein the end of a web, e.g. of a filter membrane, a sieve, a conveyer belt or the like, through sewing. The sewn web end 5 can be seen in FIG. 2. On their exterior sides the legs 1, 2 have several channels 6 in which the threads 7 used for sewing the web end 5 are guided. The threads 7 do not protrude from the channels 6 and are therefore protected against frictional wear by the ribs 8 extending in-between the channels 6. In some places the threads 7 extend through holes 18 pierced through the legs 1, 2 from one side of the connector element to the other and thereby hold the web end 5 clamped between the legs 1, 2.

Figure 2:
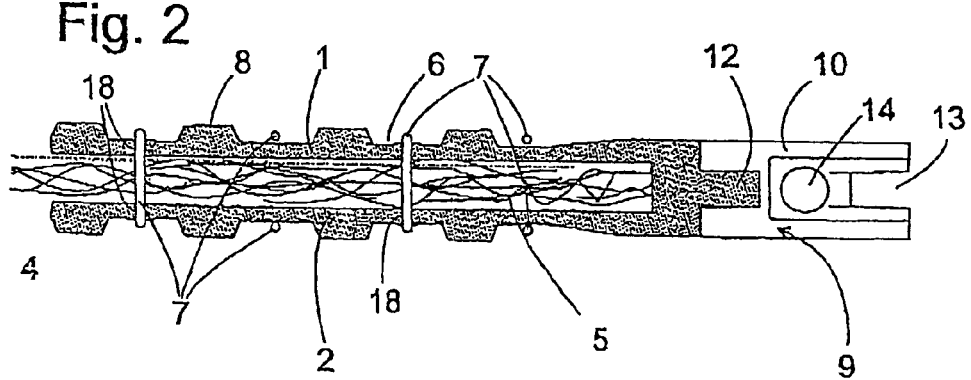
FIG. 2 shows a section through the connector element of FIG. 1 with a web end sewn thereto.

At the flank 9 of the bridge 3 facing away from the legs 1, 2 teeth 10 protrude that are each separated by teeth interspaces 11. The extension in the longitudinal direction of the profile is the same for all teeth 10 and teeth interspaces 11. In each of the teeth interspaces 11 a longitudinally extending tongue 12 is formed respectively on the flank 9. At their front face the teeth 10 each have a groove 13, the width of which corresponds to that of the tongue 12. The tongues 12 and the grooves 13 thus are formed in at least one cross-section plane extending perpendicular to the longitudinal direction, as seen in FIG. 2, where the plane of the paper corresponds to a cross-section plane extending perpendicular to the longitudinal direction. In addition, mutually aligned boreholes 14 extend through the teeth 10.

Figure 3:
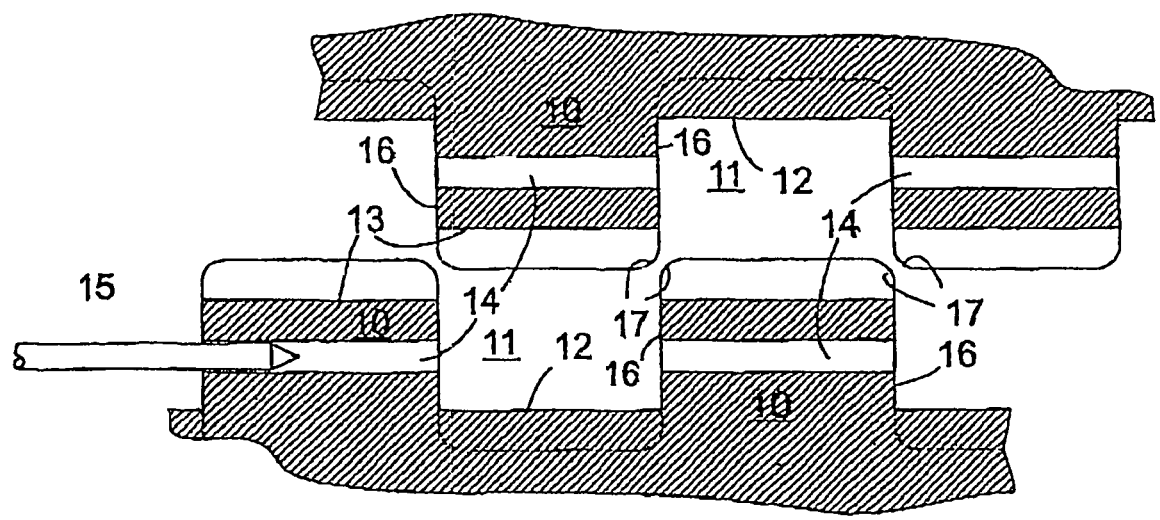
FIG. 3 shows a longitudinal section through two opposite lying connector elements according to FIG. 1, from which the course of the mutually facing contours of the connector elements can be gathered in the sectional plane as well as in a second plane.

The teeth 10 and the teeth interspaces 11 render it possible to join two identically formed profiles of the type shown in FIG. 1 into one another and bolt them together, as becomes apparent from FIG. 3 which shows two such profiles in a respective section along a longitudinal median plane of the profiles extending through the tongues 12 and grooves 13. The course of the profiles in a second plane extending parallel to the sectional plane below the grooves 13 and tongues 12 can also be gathered from the Figure. The course in a third plane above the grooves 13 and tongues 12 is identical to that of the second plane.

To facilitate the fitting of the profiles into one another the outer corners 17 of the teeth 10 are each rounded off.

If the teeth 10 and the teeth interspaces 11 of the two profiles engage correctly into one another, all boreholes 14 are in alignment and a wire 15 can be passed through the boreholes 14 to fasten the two profiles to each other. Since the lateral flanks 16 of the teeth extend orthogonally to the axis of the boreholes 14 and parallel to the direction in which the teeth and the teeth interspaces are fitted into one another, a slight free motion of the two profiles with respect to each other in the fitting direction has no negative effect on the tightness of the connection. The lateral flanks 16 are in close contact regardless of whether the teeth are completely fitted into the teeth interspaces or whether there still remains a certain amount of free motion between the front faces of the teeth 10 and the bottom of the teeth interspaces 11 when the wire 15 is inserted. Such a free motion, if present, does not lead to untightness of the connection due to the engagement of the grooves 13 and tongues 12.

Therefore, in all three of the sectional planes mentioned the profiles have a periodic course similar to that of a rectangular wave, with the period and phase of the wave being equal in all three sectional planes.

Figure 4:
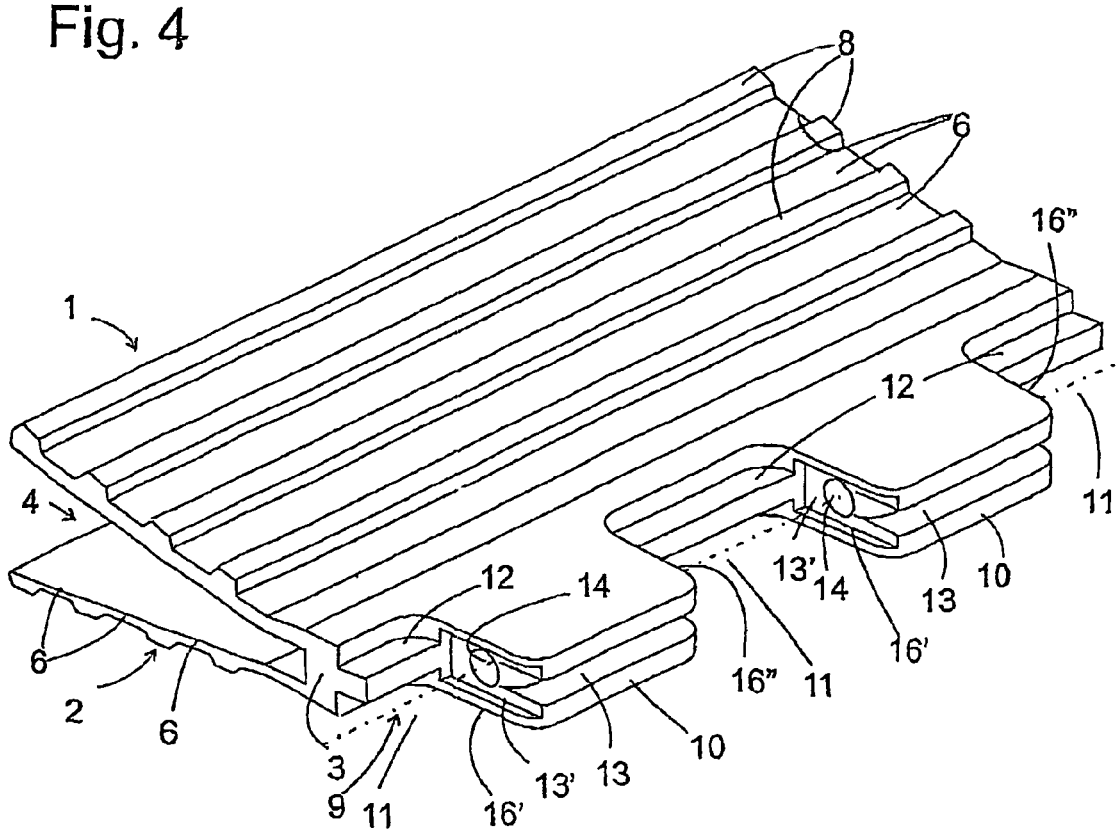
FIG. 4 shows a perspective view of a connector element according to a second embodiment of the invention.
Figure 5:
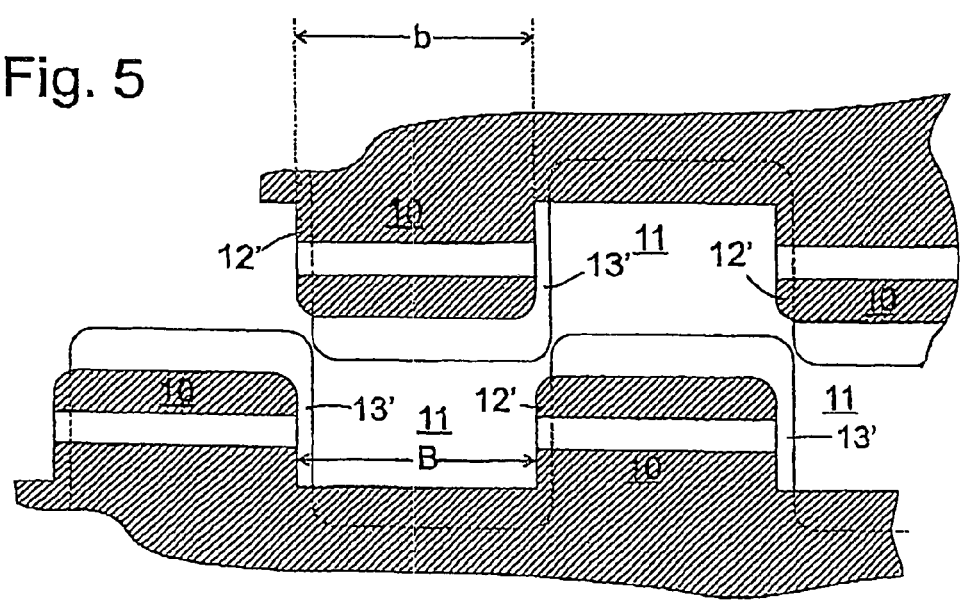
FIG. 5 shows a longitudinal section in analogy to FIG. 3 through two opposite lying connector elements according to FIG. 4.

FIGS. 4 and 5 show a perspective view of a single profile and respectively of two mutually facing profiles according to a second embodiment of the invention. The profile of this second embodiment differs from the one of FIGS. 1 and 3 in that a groove 13' and respectively a tongue 12' are also formed on the lateral flanks 16', 16" of each tooth 10'. In FIG. 4 each of the grooves 13' can only be seen, while the tongues 12' are located on the lateral flanks 16" of the teeth 10' that are directed away from the observer. The grooves 13' and tongues 12' have a double function. On the one hand they improve tightness of the engagement between two profiles if the width b of the teeth 10 is slightly smaller than the width B of the teeth interspaces 11, on the other hand the grooves 13' and tongues 12' guide the profiles during fitting so that compared to the first embodiment it is much easier to bring the grooves 13 and the tongues 12 into engagement.

As can be taken from FIG. 5, in this case the mutually facing sides of the profiles also have a periodic course similar to a rectangular wave, but here the existence of the tongues 12' and grooves 13' leads to a minimal phase shift between the course in the longitudinal median plane and the course in a sectional plane extending above or below the grooves.

The above-described profiles, on account of their having the teeth 10 and teeth interspaces 11, are not suitable for production by means of a commonly used, simple extrusion method. Although an injection molding production is possible this method only allows for the production of profiled pieces having in each case a length that is predetermined and limited by the dimensions of the injection mold. Consequently, only webs having a width that is not larger than the length of the profiled pieces could be connected by means of the profiles according to the invention. To avoid such limitations it is desirable to be able in principle to produce the profiles according to the invention in any chosen length, as a "material sold by the meter" in order to subsequently cut pieces from a very long profiled strand in the length required in each case for connecting two web ends of a given width. A method rendering this possible is set out in the following by way of FIGS. 6a to 6e.

Figure 6A:
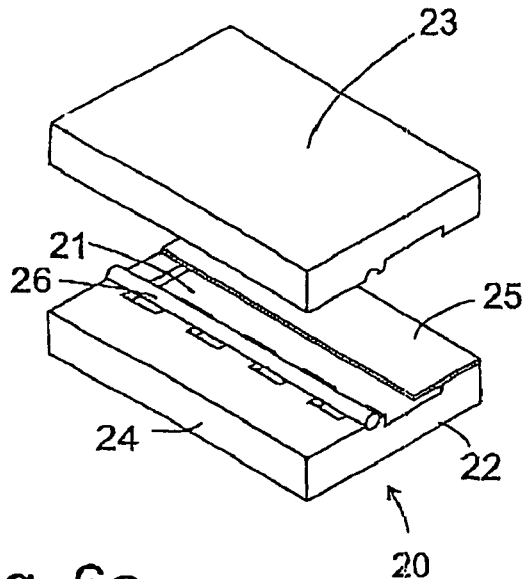
FIGS. 6a to 6e show steps of producing a connector element according to the present invention.

FIG. 6a shows parts of an injection mold 20 employed for producing the profile according to the invention. The mold cavity 21 of the injection mold 20 has a length of several tooth-tooth-interspace-periods and is open at one front face 22. The injection mold 20 substantially comprises four parts, namely an upper and a lower mold-half 23, 24, a lamella 25 that engages in the mold cavity 21 from a longitudinal side of the mold 20 in order to form the groove 4 and a wire 26 that serves to form the boreholes 14.

Figure 6B:
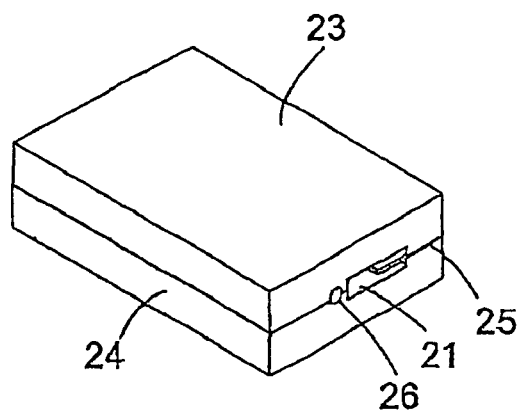

FIG. 6b shows the injection mold 20 in a partly closed state. The lamella 25 and the wire 26 are clamped between the two mold-halves 23, 24.

Figure 6C:
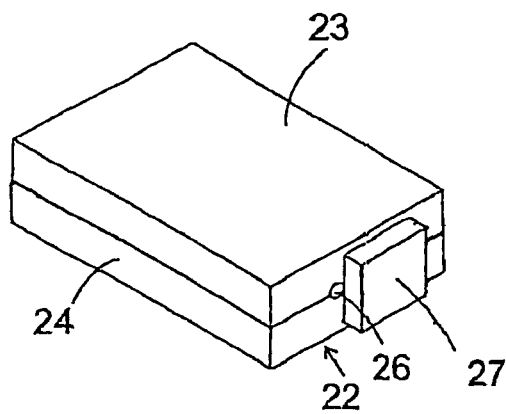

As shown in FIG. 6c, a cover 27 is placed at the front face 22 of the mold 20 so as to seal the opening of the mold cavity 21.

Figure 6D:
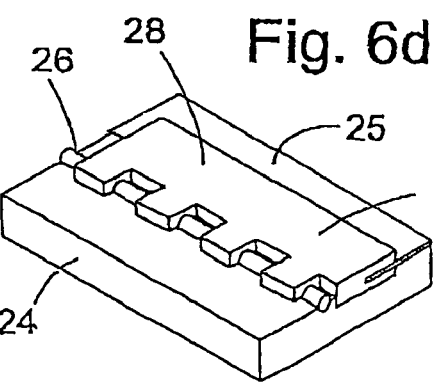

Into the mold cavity thus obtained liquid plastic material is injected in a manner known per se. Following the hardening of the plastic the mold 20 is opened, as depicted in FIG. 6d, lamella 25 and wire 26 are pulled out so that the produced profiled piece 28 can be taken out.

Figure 6E:
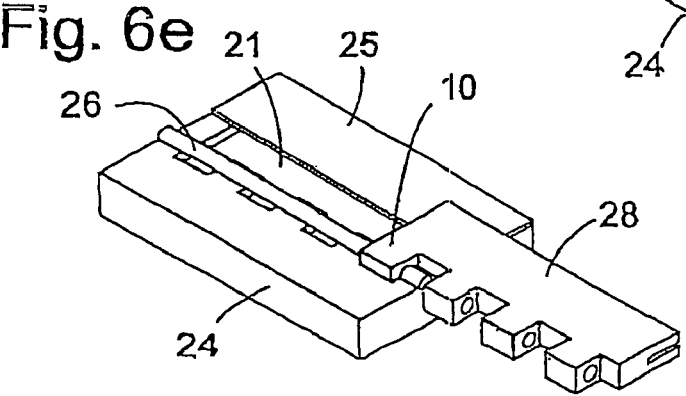

Afterwards the profiled piece is placed into the mold-half 24 again by being displaced in the longitudinal direction, and in doing so at least one tooth 10 of the profiled piece 28 is placed again into a tooth recess of the mold cavity 21. Lamella 25 and wire 26 are added on again so that the configuration illustrated in FIG. 6e is brought about.

After having placed the upper mold-half 23 the mold is ready for a further injection process, but this time the cover 27 is no longer required, since the profiled piece 28 seals the front face opening of the mold cavity 21. The plastic material which is then injected adheres during hardening to the profiled piece 28 already on hand so that in principle the said piece can reach any chosen length through repeated injection processes.

Figure 7:
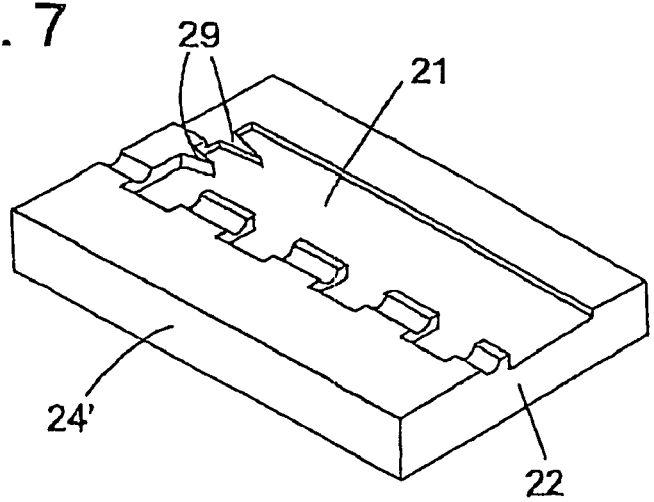
FIG. 7 shows a perspective view of a part of an injection mold that can be used in the method according to FIGS. 6a to 6e.

FIG. 7 shows the lower mold-half 24' of a modified embodiment of the injection mold. On the side of the mold cavity 21 facing away from the open front face 22 projecting prongs 29 are formed. These prongs enlarge the contact surface, on which the profiled piece 28 already finished and the section newly injected in the mold cavity 21 each time meet during production of the profile whereby the adhesion of the individual sections to each other is enhanced, too. The upper mold-half not depicted here is formed correspondingly.

To enlarge the contact surface of the profiled piece 28 already finished with the newly injected section any chosen profiling can in principle be provided on the side of the mold cavity 21 facing away from the open front face 22. This profiling does not necessarily need to have prongs that are triangular in cross-section but can also have a rectangular profile for example. To improve adhesion between the profiled piece 28 already finished and the newly injected section the profiled piece 28 already finished can also be subjected to surface treatment prior to injection at it the new section.

Apart from sewing, the connector elements and respectively the connector arrangement according to the invention can also be fastened to the web end 5, e.g. by means of gluing or welding. For a particularly durable connection these connection methods can be combined as desired. For instance, provision can be made for at least one seam and, in addition, the legs 1, 2 can be welded to the web end 5.

For a particularly secure connection of the web ends it is also possible to provide snap-in elements with barbed elements on the connector elements in addition or alternatively to the wire 15. These elements can be formed e.g. on the groove 13, 13' and/or on the tongue 12, 12'.

The invention claimed is:

1. Connector arrangement for connecting the ends of a web, comprising:
   two elongate elements, each elongate element having a longitudinal direction parallel to the edge of one of the web ends and a transverse direction perpendicular to the longitudinal direction, at least one elongate leg for fastening on one of the web ends, and a longitudinal flank which is directed away from the web end, wherein for connecting the web ends, the elongate elements are oriented with their flanks in engagement and their elongate legs extending in opposite directions,
   wherein each longitudinal flank has a first contour extending in the longitudinal direction of the elongate elements in a first longitudinal-section plane substantially parallel to a plane defined by the longitudinal and transverse directions of the at least one elongate leg, wherein the first contour is configured so that the first contour of one elongate element engages in a corresponding first contour of the other elongate element respectively,
   wherein each longitudinal flank has second and third contours in second and third longitudinal-section planes, respectively, extending parallel to the first longitudinal-section plane, wherein the second and third contours are different from the first contour and are configured so that the second and third contours of one elongate element engage in a form-fitting manner in third and second contours, respectively, of the other elongate element, and wherein the first and third contours together of each longitudinal flank form tongues and the second and third contours together of each longitudinal flank form grooves in at least one cross-section plane extending perpendicular to the longitudinal direction, wherein the tongues and the grooves of each longitudinal flank alternate, and wherein the alternating tongues and grooves of one elongate element engage the alternating grooves and tongues respectively, of the other elongate element to form tongue-and-groove joints.

2. Connector arrangement according to claim 1, wherein the second and third contours have a periodic configuration and have the same period.

3. Connector arrangement according to claim 2, wherein the second and third contours are rectangular contours.

4. Connector arrangement according to claim 3, wherein the second and third contours have the same phases as the first contour and wherein the second and third contours have differing amplitudes from the first contour.

5. Connector arrangement according to claim 2, wherein the first longitudinal-section plane lies between the second and the third longitudinal-section plane and wherein the first contour has a phase shift with respect to the second contour and the third contour.

6. Connector arrangement according to claim 1, wherein the first longitudinal-section plane lies between the second and the third longitudinal-section planes and wherein the second and third contours are congruent.

7. Connector arrangement according to claim 1, wherein the second and third, contours define mutually engaging teeth of the two elongate elements, wherein each tooth has a borehole extending in the longitudinal direction of its elongate element and wherein in a state of mutual engagement of both elongate elements the boreholes of both elongate elements are in alignment.

8. Connector arrangement according to claim 7, further comprising a wire (15) extending through the boreholes for securing the elongate elements to each other.

9. Connector arrangement according to claim 1, wherein the elongate elements are congruent.

10. Method for producing a connector arrangement according to claim 1, using an injection mold which is configured to mold therein a section of the connector element and which is open at one end of the section, comprising the steps:
 a) sealing the open end of the injection mold;
 b) injecting material into the mold in order to obtain a section of the connector element;
 c) cyclically repeating steps a) and b), wherein for sealing the mold in step a) the section obtained each time in the preceding step b) is used.

11. The connector arrangement according to claim 1, wherein the web is an endless filter web.

12. Connector element for use in a connector arrangement for connecting the ends of a web, the connector element having a longitudinal direction parallel to the edge of one of the web ends and a transverse direction perpendicular to the longitudinal direction, and comprising:

at least one elongate leg for fastening on one of the web ends, and a longitudinal flank which is directed away from the web end, wherein the longitudinal flank has a first contour extending in the longitudinal direction of the connector element in a first longitudinal-section plane substantially parallel to a plane defined by the longitudinal and transverse directions of the at least one elongate leg, wherein the first contour is configured to engage in a corresponding first contour of another, identical connector element respectively, wherein the longitudinal flank has second and third contours in second and third longitudinal-section planes, respectively, extending parallel to the first longitudinal-section plane, wherein the second and third contours are different from the first contour and are configured to engage in a form-fitting manner in respective third and second contours of another, identical connector element, wherein the first and third contours together form tongues and the second and third contours together form grooves in at least one cross-section plane extending perpendicular to the longitudinal direction, wherein the tongues and the grooves alternate, and wherein the alternating tongues and grooves of the connector element are configured to engage with alternating grooves and tongues respectively, of another, identical connector element to form tongue-and-groove joints, and wherein the leg is provided with channels along an exterior side.

13. Connector element according to claim 12, wherein the channels extend in the longitudinal direction of the connector element.

14. Connector element according to claim 12, wherein there are holes in channels extending through the leg.

15. Connector element according to claim 12, wherein a web end is sewn to the connector element by means of a thread extending in the channels.

16. Connector element according to claim 12, wherein the connector element has two legs that delimit a groove for accommodating the web end.

17. Connector element according to claim 12, wherein the connector element is formed of polyurethane, polyamide or soft PVC.

18. Method for producing a connector element according to claim 12, using an injection mold which is configured to mold therein a section of the connector element and which is open at one end of the section, comprising the steps:
 a) sealing the open end of the injection mold;
 b) injecting material into the mold in order to obtain a section of the connector element;
 c) cyclically repeating steps a) and b), wherein for sealing the mold in step b) the section obtained each time in the preceding step c) is used.

19. Method according to claim 18, wherein the second and third contours (10, 11) of the connector element have a periodic configuration, wherein the length of the section comprises several periods of the periodic configuration, and wherein for sealing the mold in step c) an end piece of the section obtained each time in the preceding step b) is placed into a part of the mold located adjacent to the opening.

* * * * *